(12) United States Patent
Eriksson Löwenmark et al.

(10) Patent No.: US 9,936,507 B2
(45) Date of Patent: Apr. 3, 2018

(54) ACCESS REQUEST MESSAGE

(71) Applicant: TELEFONAKTIEBOLAGET L M ERICSSON (PUBL), Stockholm (SE)

(72) Inventors: Stefan Eriksson Löwenmark, Färentuna (SE); Mårten Sundberg, Årsta (SE); Paul Schliwa-Bertling, Ljungsbro (SE); Nicklas Johansson, Brokind (SE); John Walter Diachina, Garner, NC (US)

(73) Assignee: TELEFONAKTIEBOLAGET L M ERICSSON (PUBL), Stockholm (SE)

( * ) Notice: Subject to any disclaimer, the term of this patent is extended or adjusted under 35 U.S.C. 154(b) by 7 days.

(21) Appl. No.: 14/937,492

(22) Filed: Nov. 10, 2015

(65) Prior Publication Data

US 2016/0135169 A1    May 12, 2016

Related U.S. Application Data

(60) Provisional application No. 62/078,316, filed on Nov. 11, 2014.

(51) Int. Cl.
*H04W 72/04* (2009.01)
*H04W 4/00* (2009.01)

(52) U.S. Cl.
CPC ......... *H04W 72/048* (2013.01); *H04W 4/005* (2013.01)

(58) Field of Classification Search
CPC .................................................. H04W 72/048
See application file for complete search history.

(56) References Cited

PUBLICATIONS

Ericsson: "Clarification of assembling convention for RLC/MAC control blocks", 3GPP Draft; GP-000811, 3rd Generation Partnership Project (3GPP), Mobile Competence Centre; 650, Route Des Lucioles; F-06921 Sophia-Antipolis Cedex; France, vol. TSG Geran, No. Norrtalje; Nov. 9, 2000, Nov. 9, 2000 (Nov. 9, 2000), XP050001534, abstract, section 11.2.5, section 11.2.5a, Table 2.
Telefon AB LM Ericsson et al: "MTC Device Priority Access". 3GPP Draft; GP-100891—MTC Device Priority Access, 3rd Generation Partnership Project—(3GPP), Mobile Competence Centre; 650, Route Des Lucioles; F-06921 Sophia-Antipolis Cedex; France, vol. TSG Geran, No. Jeju; May 12, 2010, May 12, 2010 (May 12, 2010), XP050417126, the whole document.
Telefon AB LM Ericsson et al: "MTC Device Single Block Packet Access". 3GPP Draft; GP-100889—MTC Device Single Block Packet Access, 3rd Generation Partnership Project (3GPP), Mobile Competence Centre; 650, Route Des Lucioles; F-06921 Sophia-Antipolis Cedex; France, vol. TSG Geran, No. Jeju; May 12, 2010, May 12, 2010 (May 12, 2010), XP050417124, the whole document.

(Continued)

*Primary Examiner* — Vladimir Magloire
*Assistant Examiner* — David Orange (57) ABSTRACT

A wireless device (e.g., Machine Type Communications (MTC) device), a wireless access node (e.g., Base Station Subsystem (BSS)), and various methods are described herein for utilizing an access request message (e.g., an 11-bit Enhanced General Packet Radio Service (EGPRS) packet channel request message that comprises a three bit Short Access Request code point "100" and eight bits thereafter, where at least a portion of the eight bits is used to indicate at least one capability of the wireless device) within a wireless communication network.

8 Claims, 6 Drawing Sheets

(56) References Cited

PUBLICATIONS

Telefon AB LM Ericsson et al: "Realizing the Low Priority Indication", 3GPP Draft; GP-101899, 3rd Generation Partnership Project (3GPP), Mobile Competence Centre; 650, Route Des Lucioles; F-06921 Sophia-Antipolis Cedex; France, vol. TSG Geran, No. San Jose del Cabo; Nov. 22, 2010, (Nov. 18, 2010), XP050486183, the whole document.

GP-041074, 3GPP TSG-Geran Meeting #19, Cancun, Mexico, Apr. 19-23, 2004, Change Request for 44.060 CR 504, rev. 1, current version 6.6.0, the whole document.

3GPP TS 44.060 V6.0.0 (Dec. 2002), 3rd Generation Partnership Project; Technical Specification Group GSM/EDGE Radio Access Network; General Packet Radio Service (GPRS); Mobile Station (MS)—Base Station System (BSS) interface; Radio Link Control/Medium Access Control (RLC/MAC) protocol (Release 6), the whole document.

3GPP TS 44.060 V7.0.0 (Jul. 2005), 3rd Generation Partnership Project; Technical Specification Group GSM/EDGE Radio Access Network; General Packet Radio Service (GPRS); Mobile Station (MS)—Base Station System (BSS) interface; Radio Link Control/Medium Access Control (RLC/MAC) protocol (Release 7), the whole document.

3GPP TS 44.018 V12.3.0 (Sep. 2014), 3rd Generation Partnership Project; Technical Specification Group GSM/EDGE Radio Access Network; Mobile radio interface layer 3 specification; Radio Resource Control (RRC) protocol (Release 12), the whole document.

FIG. 1

```
< Packet channel request 11 bit message content > ::=
    < One Phase Access Request :              0        < MultislotClass : bit (5) >
                                                       < Priority : bit (2) >
                                                       < RandomBits : bit (3) > >
    | < Short Access Request : ~202         100        -- The value 100 was allocated in an
      earlier version of the protocol and shall not be used by the mobile station
                                                       < NumberOfBlocks : bit (3) >
                                                       < Priority : bit (2) >
                                                       < RandomBits : bit (3) > >
    | < Two Phase Access Request :         110000      < Priority : bit (2) >
                                                       < RandomBits : bit (3) > >
    | < Page Response :                    110001      < RandomBits : bit (5) > >
    | < Cell Update :                      110010      < RandomBits : bit (5) > >
    | < MM Procedure :                     110011      < RandomBits : bit (5) > >
    | < Single Block Without TBF Establishment : 110100  < RandomBits : bit (5) > >
    | < One Phase Access Request in RLC unack mode : 110101  < RandomBits : bit (5) > >
    | < Dedicated channel request :        110110      < RandomBits : bit (5) > >
    | < Emergency call :                   110111      < RandomBits : bit (5) > >
    | < Single block MBMS access :         111000      < RandomBits : bit (5) > > ;
```

ACCESS REQUEST MESSAGE

CLAIM OF PRIORITY

This application claims the benefit of priority to U.S. Provisional Application Ser. No. 62/078,316, filed on Nov. 11, 2014, the entire contents of which are hereby incorporated by reference for all purposes.

TECHNICAL FIELD

The present disclosure relates generally to the wireless communications field, and, more particularly, to a wireless device (e.g., Machine Type Communications (MTC) device), a wireless access node (e.g., Base Station Subsystem (BSS)), and various methods for utilizing an optimized access request message (e.g., an optimized Enhanced General Packet Radio Service (EGPRS) packet channel request message) within a wireless communication network.

BACKGROUND

The following abbreviations and terms are herewith defined, at least some of which are referred to within the following description of the present disclosure.
3GPP 3rd-Generation Partnership Project
ASIC Application Specific Integrated Circuit
BCCH Broadcast Control Channel
BS Base Station
BSS Base Station Subsystem
DSP Digital Signal Processor
EDGE Enhanced Data rates for GSM Evolution
EGPRS Enhanced General Packet Radio Service
GSM Global System for Mobile Communications
GERAN GSM/EDGE Radio Access Network
GPRS General Packet Radio Service
IoT Internet of Things
LTE Long-Term Evolution
MCS Modulation and Coding Scheme
MS Mobile Station
MTC Machine Type Communications
PDN Packet Data Network
RACH Random Access Channel
RAN Radio Access Network
RLC Radio Link Control
SGSN Serving GPRS Support Node
TDMA Time Division Multiple Access
TS Technical Specifications
UE User Equipment
USF Uplink State Flag
WCDMA Wideband Code Division Multiple Access
WiMAX Worldwide Interoperability for Microwave Access
MTC Device: An MTC device used in the wireless world is a device typically used to convey small reports (e.g., 10 to 20 octets of telemetric data) to an application server in an Internet Protocol (IP) connected network either autonomously (e.g., on a periodic basis) or when polled to do so (e.g., in response to being paged and sent a subsequent command that triggers the MTC device to send a report).

In the wireless communications field, the telecommunications companies are constantly trying to improve how a wireless device (e.g., MTC device) can access and communicate with a wireless access node (e.g., BSS). Various ways that improve how the wireless device (e.g., MTC device) can access and communicate with the wireless access node (e.g., BSS) is the subject of the present disclosure.

SUMMARY

A wireless device, a wireless access node, and various methods for utilizing an optimized access request message (e.g., an optimized EGPRS packet channel request message) are described in the independent claims. Advantageous embodiments of the wireless device, the wireless access node, and the various methods are further described in the dependent claims.

In one aspect, the present disclosure provides a wireless device configured to interact with a wireless access node. The wireless device comprises a processor and a memory that stores processor-executable instructions, wherein the processor interfaces with the memory to execute the processor-executable instructions, whereby the wireless device is operable to perform a transmitting operation. In the transmitting operation, the wireless device transmits, to the wireless access node, an access request message which comprises a three bit Short Access Request code point "100" and indicates at least one capability of the wireless device. An advantage of the wireless device indicating at least one of its capabilities in the access request message is that this is more power efficient and signaling efficient than (a) having the wireless device send its capability information after it has already been assigned radio resources (required for sending a report) by an Immediate Assignment message which would require an extra uplink radio block transmission to the wireless access node (e.g., this would happen if the legacy two-phase access procedure was used wherein a wireless device sends the ADDITIONAL MS RADIO ACCESS CAPABILITIES message using an extra radio block assigned specifically for sending this message), or (b) having the wireless access node query the core network (e.g., the SGSN) for capabilities of the wireless device after receiving at least one radio block on the assigned radio resources that identifies the sending wireless device and then modifying the assigned radio resources accordingly.

In another aspect, the present disclosure provides a method in a wireless device which is configured to interact with a wireless access node. The method comprises a transmitting step. In the transmitting step, the wireless device transmits, to the wireless access node, an access request message which comprises a three bit Short Access Request code point "100" and indicates at least one capability of the wireless device. An advantage of the wireless device indicating at least one of its capabilities in the access request message is that this is more power efficient and signaling efficient than (a) having the wireless device send its capability information after it has already been assigned radio resources (required for sending a report) by an Immediate Assignment message which would require an extra uplink radio block transmission to the wireless access node (e.g., this would happen if the legacy two-phase access procedure was used wherein a wireless device sends the ADDITIONAL MS RADIO ACCESS CAPABILITIES message using an extra radio block assigned specifically for sending this message), or (b) having the wireless access node query the core network (e.g., the SGSN) for capabilities of the wireless device after receiving at least one radio block on the assigned radio resources that identifies the sending wireless device and then modifying the assigned radio resources accordingly.

In yet another aspect, the present disclosure provides a wireless access node configured to interact with a wireless device. The wireless access node comprises a processor and a memory that stores processor-executable instructions, wherein the processor interfaces with the memory to execute the processor-executable instructions, whereby the wireless access node is operable to perform a receive operation. In the receive operation, the wireless access node receives, from the wireless device, an access request message which comprises a three bit Short Access Request code point "100" and indicates at least one capability of the wireless device. An advantage of the wireless access node having knowledge of at least one capability of the wireless device is that the wireless access node can now use an Immediate Assignment message to immediately assign the wireless device appropriate radio resources which are based on the indicated at least one capability of the wireless device.

In still yet another aspect, the present disclosure provides a method in a wireless access node which is configured to interact with a wireless device. The method comprises a receiving step. In the receiving step, the wireless access node receives, from the wireless device, an access request message which comprises a three bit Short Access Request code point "100" and indicates at least one capability of the wireless device. An advantage of the wireless access node having knowledge of at least one capability of the wireless device is that the wireless access node can now use an Immediate Assignment message to immediately assign the wireless device appropriate radio resources which are based on the indicated at least one capability of the wireless device.

Additional aspects of the invention will be set forth, in part, in the detailed description, figures and any claims which follow, and in part will be derived from the detailed description, or can be learned by practice of the invention. It is to be understood that both the foregoing general description and the following detailed description are exemplary and explanatory only and are not restrictive of the invention as disclosed.

BRIEF DESCRIPTION OF THE DRAWINGS

A more complete understanding of the present invention may be obtained by reference to the following detailed description when taken in conjunction with the accompanying drawings.

DETAILED DESCRIPTION

Figure 1:
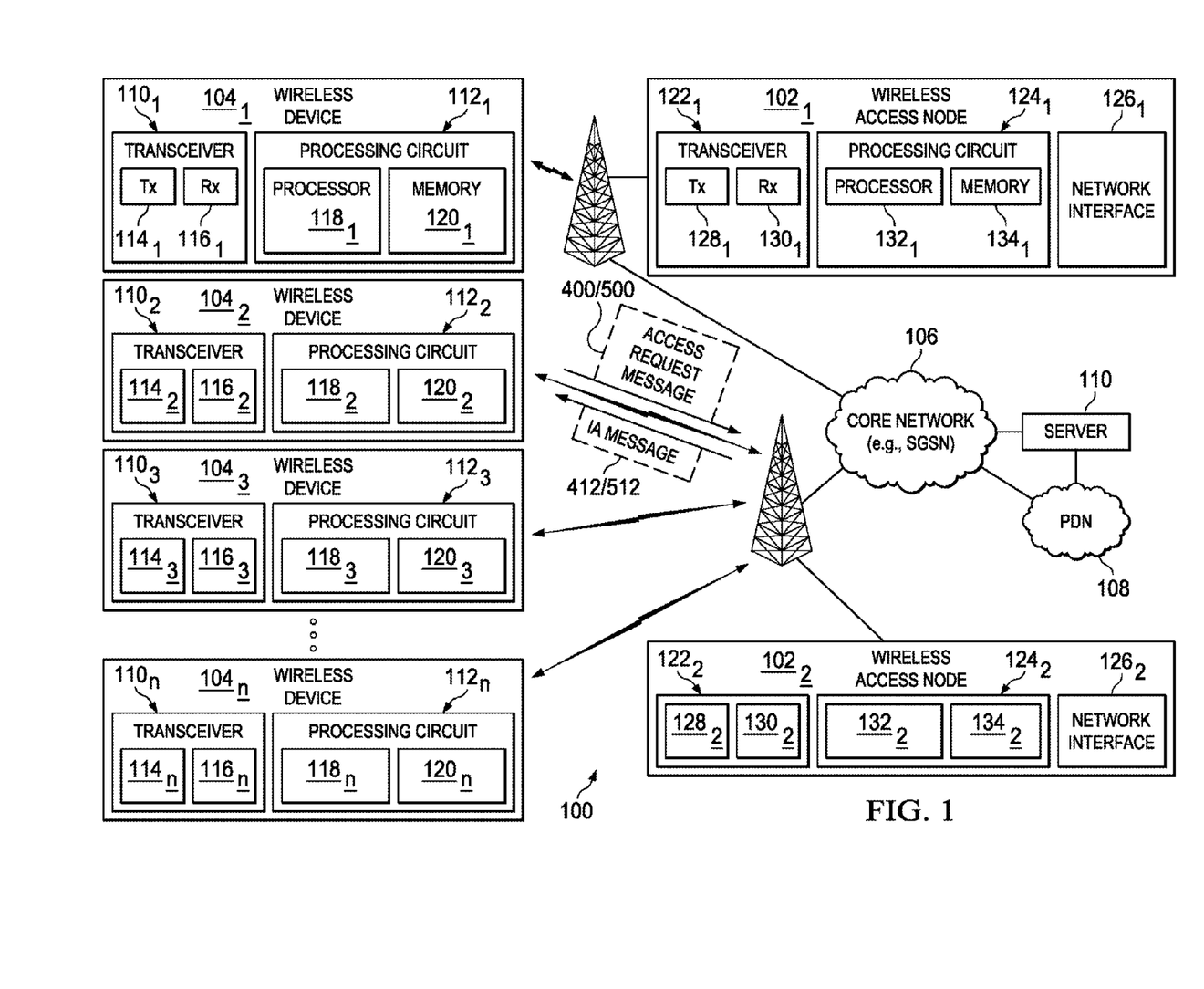
FIG. 1 is a diagram of an exemplary wireless communication network which includes multiple wireless devices (e.g., MTC devices) and multiple wireless access nodes (e.g., BSSs), all of which are configured in accordance with the present disclosure.

To describe the technical features of the present disclosure, a discussion is provided first to describe an exemplary wireless communication network which includes multiple wireless devices (e.g., MTC devices) and multiple wireless access nodes (e.g., BSSs), all of which are configured in accordance with the present disclosure (illustrated in FIG. 1). Then, a discussion is provided to explain the traditional access request messages (e.g., traditional EGPRS packet channel request messages) and the optimized access request messages (e.g., optimized EGPRS packet channel request messages) which are configured in accordance with the present disclosure (illustrated in FIGS. 2-5). Thereafter, a discussion is provided to explain the basic functionalities-configurations of the wireless devices (e.g., MTC devices) and the wireless access nodes (e.g., BSSs) and how the optimized access request messages (e.g., optimized EGPRS packet channel request messages) are utilized in accordance with the present disclosure (illustrated in FIGS. 6-9).

Exemplary Wireless Communication Network 100

Referring to FIG. 1, there is illustrated an exemplary wireless communication network 100 in accordance with the present disclosure. The wireless communication network 100 includes multiple wireless access nodes $102_1$ and $102_2$ (only two shown), multiple wireless devices $104_1$, $104_2$, $104_3$ . . . $104_n$, and a core network 106 (e.g., SGSN core network 106). The wireless communication network 100 also includes many other well-known components, but for clarity, only the components needed to describe the features of the present disclosure are described herein. Further, the wireless communication network 100 is described herein as being an GSM/EGPRS wireless communication network 100 which is also known as an EDGE wireless communication network 100. However, those skilled in the art will readily appreciate that the techniques of the present disclosure which are applied to the GSM/EGPRS wireless communication network 100 are generally applicable to other types of wireless communication systems, including, for example, WCDMA, LTE, and WiMAX systems.

The wireless communication network 100 includes the wireless access nodes $102_1$ and $102_2$ (only two shown) which provide network access to the wireless devices $104_1$, $104_2$, $104_3$ . . . $104_n$. In this example, the wireless access node $102_1$ is providing network access to wireless device $104_1$ while the wireless access node $102_2$ is providing network access to wireless devices $104_2$, $104_3$ . . . $104_n$. The wireless access nodes $102_1$ and $102_2$ are connected to the core network 106 (e.g., SGSN core network 106). The core network 106 is connected to an external packet data network (PDN) 108, such as the Internet, and a server 110 (only one shown). The wireless devices $104_1$, $104_2$, $104_3$ . . . $104_n$ may communicate with one or more servers 110 (only one shown) connected to the core network 106 or the PDN 108.

The wireless devices $104_1$, $104_2$, $104_3$ . . . $104_n$ may refer generally to an end terminal (user) that attaches to the wireless communication network 100, and may refer to either a MTC device (e.g., smart meter) or a non-MTC device. Thus, the term may be synonymous with the term mobile device, mobile station (MS), "User Equipment" or UE, as that term is used by the 3rd-Generation Partnership Project (3GPP), and includes standalone wireless devices, such as terminals, cell phones, tablets, smart phones, IoT devices, and wireless-equipped personal digital assistants, as well as wireless cards or modules that are designed for attachment to or insertion into another electronic device, such as a personal computer, electrical meter, etc.

Likewise, unless the context clearly indicates otherwise, the terms "wireless access node $102_1$ and $102_2$" and "RAN node" are used herein in their most general sense to refer to wireless access nodes such as a base station or a wireless access point in a wireless communication network, and may refer to wireless access nodes that are controlled by a physically distinct radio network controller as well as to more autonomous access points, such as the so-called evolved Node Bs (eNodeBs) in LTE networks.

Each wireless device $104_1$, $104_2$, $104_3$ ... $104_n$ may include a transceiver circuit $110_1$, $110_2$, $110_3$ ... $110_n$ for communicating with the wireless access nodes $102_1$ and $102_2$, and a processing circuit $112_1$, $112_2$, $112_3$ ... $112_n$ for processing signals transmitted from and received by the transceiver circuit $110_1$, $110_2$, $110_3$ ... $110_n$ and for controlling the operation of the corresponding wireless device $104_1$, $104_2$, $104_3$ ... $104_n$. The transceiver circuit $110_1$, $110_2$, $110_3$ ... $110_n$ may include a transmitter $114_1$, $114_2$, $114_3$ ... $114_n$ and a receiver $116_1$, $116_2$, $116_3$ ... $116_n$, which may operate according to any standard, e.g., the GSM/EDGE standard. The processing circuit $112_1$, $112_2$, $112_3$ ... $112_n$ may include a processor $118_1$, $118_2$, $118_3$ ... $118_n$ and a memory $120_1$, $120_2$, $120_3$ ... $120_n$ for storing program code for controlling the operation of the corresponding wireless device $104_1$, $104_2$, $104_3$ ... $104_n$. The program code may include code for performing the procedures (e.g., generating and transmitting an optimized access request message which comprises an active three bit Short Access Request code point "100" and includes at least one capability of the wireless device $104_1$, $104_2$, $104_3$ ... $104_n$, receiving an enhanced immediate assignment message including assigned radio resources based on the at least one capability of the wireless device $104_1$, $104_2$, $104_3$ ... $104_n$) as described hereinafter.

Each wireless access node $102_1$ and $102_2$ may include a transceiver circuit $122_1$ and $122_2$ for communicating with wireless devices $104_1$, $104_2$, $104_3$ ... $104_n$, a processing circuit $124_1$ and $124_2$ for processing signals transmitted from and received by the transceiver circuit $122_1$ and $122_2$ and for controlling the operation of the corresponding wireless access node $102_1$ and $102_2$, and a network interface $126_1$ and $126_2$ for communicating with the core network 106. The transceiver circuit $122_1$ and $122_2$ may include a transmitter $128_1$ and $128_2$ and a receiver $130_1$ and $130_2$, which may operate according to any standard, e.g., the GSM/EDGE standard. The processing circuit $124_1$ and $124_2$ may include a processor $132_1$ and $132_2$ and a memory $134_1$ and $134_2$ for storing program code for controlling the operation of the corresponding wireless access node $102_1$ and $102_2$. The program code may include code for performing the procedures (e.g., receiving an optimized access request message which comprises an active three bit Short Access Request code point "100" and includes at least one capability of the wireless device $104_1$, $104_2$, $104_3$ ... $104_n$, generating and transmitting an enhanced immediate assignment message including assigned radio resources based on the at least one capability of the wireless device $104_1$, $104_2$, $104_3$ ... $104_n$) as described hereinafter.

Optimized Access Request Messages

Figure 2:
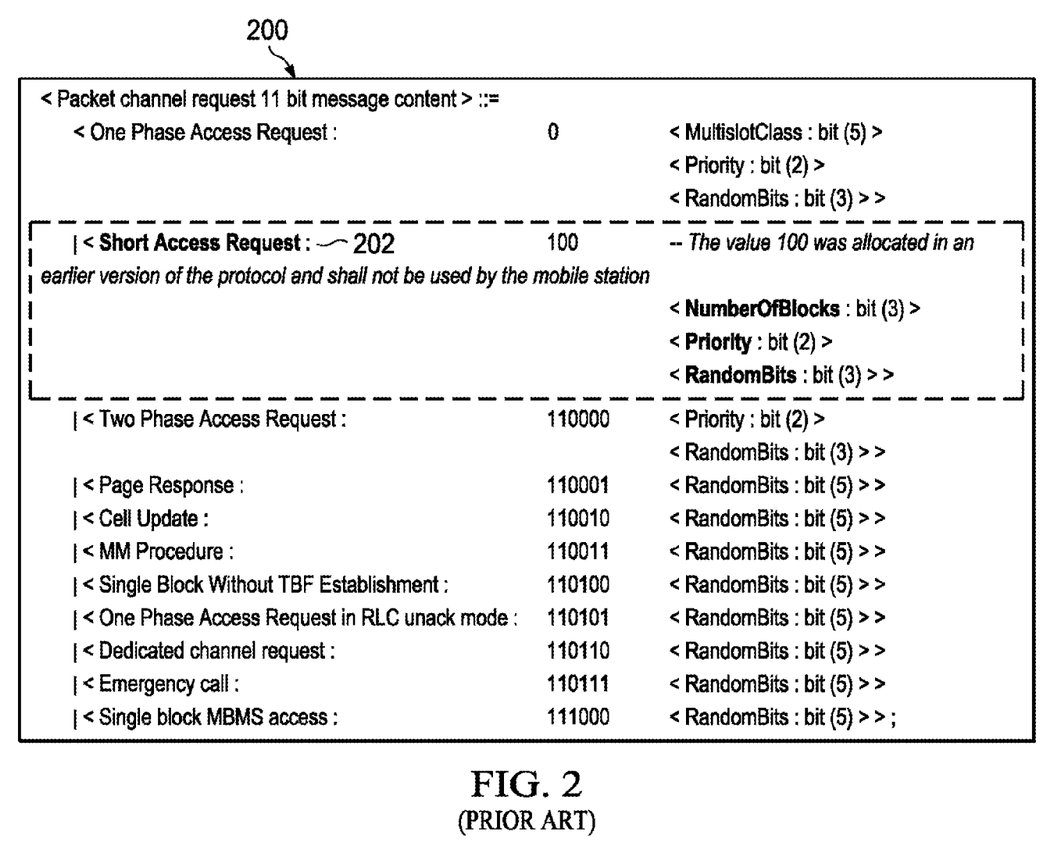
FIG. 2 (PRIOR ART) is a diagram illustrating a current standardized 11 bit EGPRS PACKET CHANNEL REQUEST message in accordance with 3GPP TS 44.060 V7.0.0 (2005-07)
Figure 3:
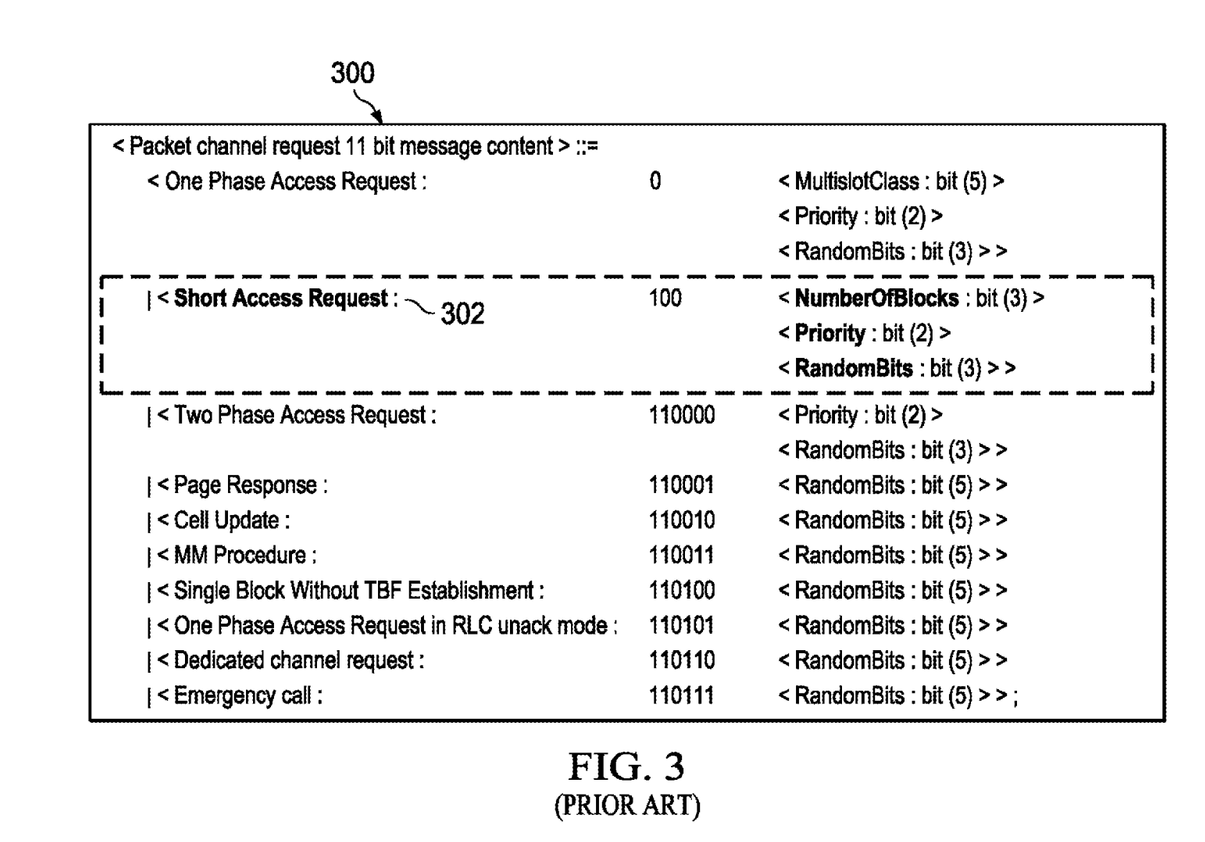
FIG. 3 (PRIOR ART) is a diagram illustrating a former standardized 11 bit EGPRS PACKET CHANNEL REQUEST message in accordance with 3GPP TS 44.060 V6.0.0 (2002-12)

In 3GPP TS 44.060 V7.0.0 (2005-07), the current standardized 11 bit EGPRS PACKET CHANNEL REQUEST message 200 (access request message 200) includes a code point '100' 202 called 'Short Access Request' (i.e., the first 3 bits of the 11 bit RACH burst) as shown in the dashed box in FIG. 2 (PRIOR ART). As can be seen, the use of this Short Access Request code point '100' 202 has been discontinued and is no longer used by wireless devices. The Short Access Request code point "100" 302 was last used by the wireless device in an 11 bit EGPRS PACKET CHANNEL REQUEST message 300 (access request message 300) as shown in FIG. 3 (PRIOR ART) and discussed in 3GPP TS 44.060 V6.0.0 (2002-12). The contents of 3GPP TS 44.060 V7.0.0 (2005-07) and 3GPP TS 44.060 V6.0.0 (2002-12) are hereby incorporated herein by reference.

Figure 4:
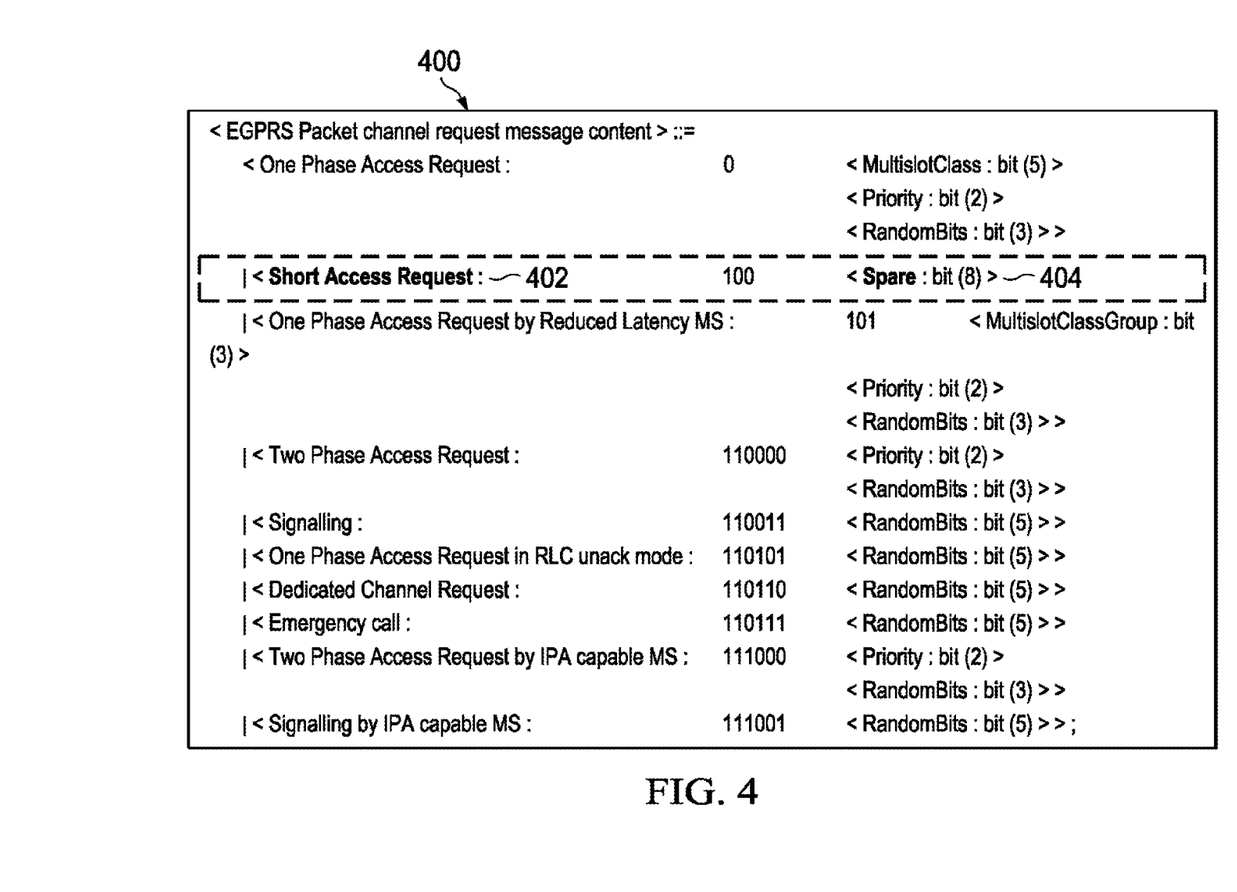
FIG. 4 is a diagram illustrating an 11 bit EGPRS PACKET CHANNEL REQUEST message in accordance with the present disclosure.

The present disclosure proposes a new 11 bit EGPRS PACKET CHANNEL REQUEST message 400 (access request message 400) as shown in FIG. 4 (see also FIG. 1 where the wireless device $104_2$ is shown transmitting the new 11 bit EGPRS PACKET CHANNEL REQUEST message 400 (access request message 400) to the wireless access node $102_2$). The new 11 bit EGPRS PACKET CHANNEL REQUEST message 400 (access request message 400) has a re-activated Short Access Request code point '100' 402 and re-defined eight bits 404 (shown as spare: bit (8)—see dashed box in FIG. 4) located after the Short Access Request code point '100' 402. In particular, the spare eight bits 404 or a portion thereof would be set to indicate one or more capabilities of the wireless device $104_2$ (for example). The wireless device $104_2$ can use a portion of the spare eight bits 404 to indicate one or more capabilities as follows (for example): (1) power efficient operation (e.g., no access to external power); (2) access priority (e.g., alarm reporting); and (3) EGPRS support. The advantages of indicating the capability or capabilities of the wireless device $104_2$ in the new 11 bit EGPRS PACKET CHANNEL REQUEST message 400 (access request message 400) will be discussed in detail below.

Figure 5:
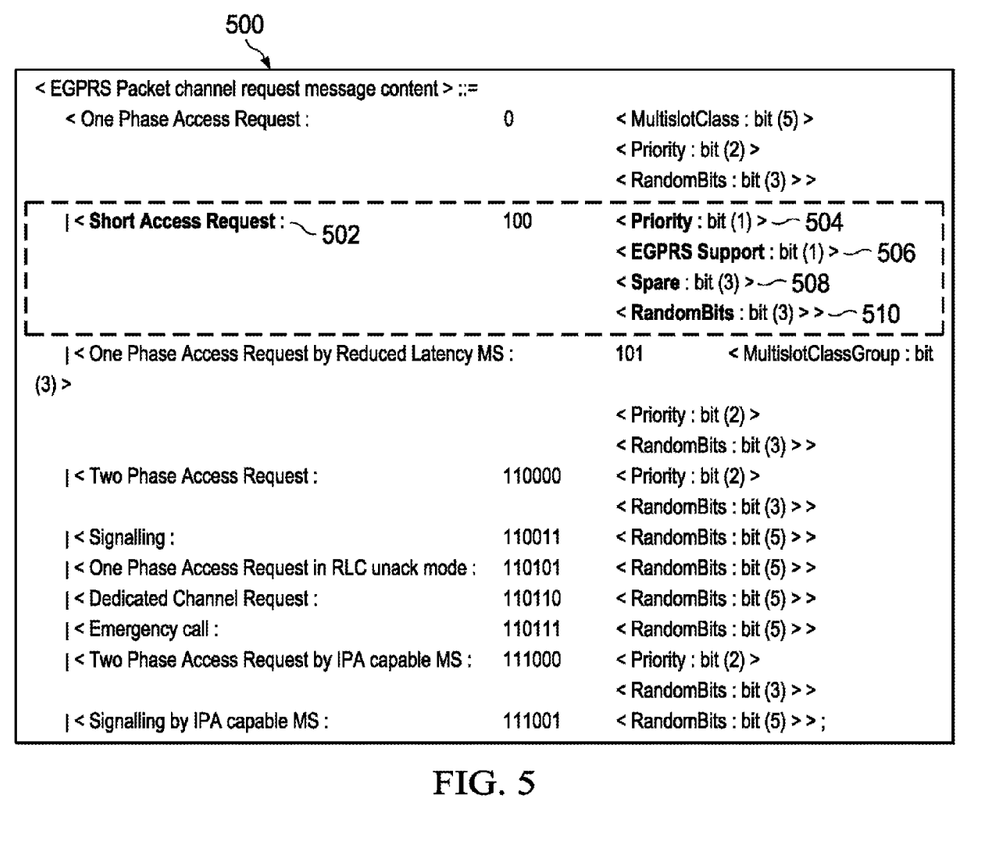
FIG. 5 is a diagram illustrating an 11 bit EGPRS PACKET CHANNEL REQUEST message in accordance with an exemplary implementation of the present disclosure.

One implementation example of re-using the Short Access Request code point '100' is shown in FIG. 5 which illustrates an 11 bit EGPRS PACKET CHANNEL REQUEST message 500 (access request message 500). The 11 bit EGPRS PACKET CHANNEL REQUEST message 500 (access request message 500) has the re-activated Short Access Request code point '100' 502 and the following eight bits have the specifically defined fields: (1) a one bit priority field 504; (2) a one bit EGPRS support field 506; (3) a three bit spare field 508; and (4) a three bit randombits field 510. In one example, the fields 504, 506, 508 and 510 can be configured as follows Priority field 504 (1 bit field): The one bit priority field 504 indicates the priority of the uplink data transfer being requested by the wireless device $104_2$ as follows:
0 low priority packet transfer
1 high priority packet transfer
EGPRS support field 506 (1 bit field): The one bit EGPRS support field 506 indicates whether or not MCS-5 through MCS-9 modulations (inclusive) are supported by the wireless device $104_2$ as follows:
0 MCS-5 through MCS-9 not supported
1 MCS-5 through MCS-9 supported
Spare field 508 (3 bit field): The three bit spare field 508 can be used to indicate one or more capabilities of the wireless device $104_2$. For example, the bits "001" can indicate power efficient operation (e.g., no access to external power). In another example, the bits "010" can indicate access priority (e.g., alarm reporting). In yet another example, the bits "100" can indicate EGPRS support. As can be appreciated the 3 bits can be specifically defined to indicate any type of capability or capabilities of the wireless device $104_2$.

RandomBits field 510 (3 bit field): The three bit randombits field 510 is randomly set by the wireless device $104_2$ to a value in the set {000, 001, 010, . . . 110, 111} and is echoed by the wireless access node $102_2$ in an Immediate Assignment (IA) message 512 transmitted to the wireless device $104_2$ (see FIG. 1). These echoed three bits 510 are used by the wireless device $104_2$ to match the received Immediate Assignment message 512 to the 11 bit EGPRS PACKET CHANNEL REQUEST message 500 (access request message 500) previously transmitted to the wireless access node $102_2$ on the RACH.

The wireless device $104_2$ transmits the 11 bit EGPRS PACKET CHANNEL REQUEST message 400 and 500 (as per FIGS. 4-5 or variations thereof) to the wireless access node $102_2$. In response, the wireless access node $102_2$ transmits a modified Immediate Assignment (IA) message 412 and 512 to the wireless device $104_2$ (see FIG. 1). There is an advantage associated with the wireless device $104_2$ indicating one or more of its capabilities (e.g., power efficient operation, access priority, EGPRS support) in the 11 bit EGPRS PACKET CHANNEL REQUEST message 400 and 500 (or variations thereof) which is transmitted to the wireless access node $102_2$. The advantage is that the wireless access node $102_2$ by having knowledge about the one or more capabilities of the wireless device $104_2$ can use the modified Immediate Assignment message 412 and 512 to immediately (e.g., without delay or further messaging/signaling) assign the appropriate radio resources to the wireless device $104_2$ where the appropriate radio resources are based on the indicated one or more capabilities of the wireless device $104_2$. This process is a marked improvement over the traditional case where the wireless access node (e.g., BSS) (a) asks the wireless device (e.g., MTC device) to report its capabilities after the wireless access node (e.g., BSS) has transmitted an Immediate Assignment message to the wireless device or (b) queries the core network for capabilities of the wireless device after receiving at least one radio block on the assigned radio resources that identifies the sending wireless device and then modifying the assigned radio resources accordingly. Stated another way, the use of the modified 11 bit EGPRS PACKET CHANNEL REQUEST message 400 and 500 (or variations thereof) per the present disclosure to indicate the wireless device's capabilities to the wireless access node is more power efficient and signaling efficient than (a) having the wireless device as in the past send its capability information after the wireless device has been assigned radio resources by the Immediate Assignment message which would require an extra uplink radio block transmission or (b) having the wireless access node query the core network for capabilities of the wireless device after receiving at least one radio block on the assigned radio resources that identifies the sending wireless device and then modifying the assigned radio resources accordingly. In some embodiments, the Immediate Assignment message 412 or 512 is modified such that a legacy wireless device that still uses the three bit Short Access Request code point "100" in a legacy access request message will not receive a matching Immediate Assignment message.

To highlight this advantage assume that the wireless device $104_2$ transmits the 11 bit EGPRS PACKET CHANNEL REQUEST message 400 and 500 (or variations thereof) which indicates to the wireless access node $102_2$ that (a) the wireless device $104_2$ (e.g., MTC device $104_2$) is power limited and therefore should be managed by the wireless access node $102_2$ in a way that allows the wireless device $104_2$ to realize an extended battery lifetime; and/or (b) the wireless device $104_2$ (e.g., MTC device $104_2$) can remain operational in radio conditions that are substantially worse than those typically targeted by cells deployed within the wireless communication network 100. The wireless access node $102_2$ (e.g., BSS $102_2$) can then, based on this capability information, appropriately manage the wireless device $104_2$ (e.g., MTC device $104_2$). For example, in case (a) the wireless access node $102_2$ (e.g., BSS $102_2$) can use the knowledge of the wireless device $104_2$ (e.g., MTC device $104_2$) being power limited (e.g., no access to external power) to ensure that the system access procedure is completed using a 1 phase access (see 3GPP TS 44.018 V12.3.0 (2014-09)—the contents of which are incorporated by reference herein) and to avoid requesting measurement information from the wireless device $104_2$ (e.g., MTC device $104_2$) while it is in packet transfer mode. For case (b) the wireless access node $102_2$ (e.g., BSS $102_2$) can, for example, use the radio condition information which is also provided by the wireless device $104_2$ (e.g., MTC device $104_2$) in the 11 bit EGPRS PACKET CHANNEL REQUEST message 400 or 500 (or variations thereof) to determine how many repetitions of downlink radio blocks that the wireless access node $102_2$ (e.g., BSS $102_2$) should send to help ensure reception by and/or to inform the wireless device $104_2$ (e.g., MTC device $104_2$) of how many repetitions of uplink radio blocks the wireless device $104_2$ (e.g., MTC device $104_2$) should use to help ensure the reception of the uplink radio blocks by the wireless access node $102_2$ (e.g., BSS $102_2$).

In addition, the wireless device $104_2$ can within the 11 bit EGPRS PACKET CHANNEL REQUEST message 400 or 500 (or variations thereof) indicate other capabilities including an indication of the ability to remain operational during substantially degraded radio conditions. For example, if the wireless device $104_2$ provides an indication of this capability then this indication implicitly indicates to the wireless access node $102_2$ that the wireless device $104_2$ supports an optimized RLC protocol layer and an optimized/relaxed mobility management procedure. The optimized RLC protocol layer can take into account the need for multiple transmissions of each uplink and downlink radio block in order for the wireless device $104_2$ to operate in degraded radio conditions. The optimized/relaxed mobility management procedure can take into account the need for the wireless device $104_2$ to make substantially fewer measurements of the neighbor cells while in packet idle mode and packet transfer mode.

Figure 6:
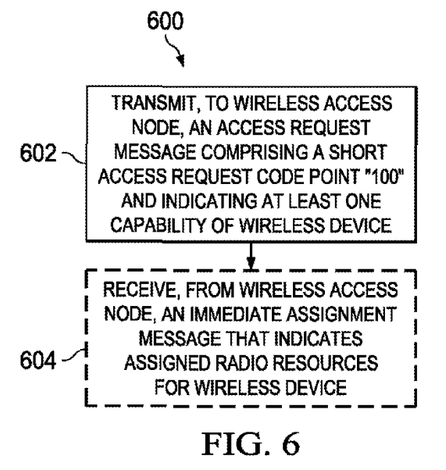
FIG. 6 is a flowchart of a method implemented in a wireless device in accordance with an embodiment of the present disclosure.

Basic Functionalities-Configurations of Wireless Device and Wireless Access Node Referring to FIG. 6, there is a flowchart of a method 600 implemented in a wireless device $104_2$ (for example) in accordance with an embodiment of the present disclosure. At step 602, the wireless device $104_2$ transmits, to the wireless access node $102_2$, an access request message 400 and 500 (e.g., 11 bit EGPRS PACKET CHANNEL REQUEST message 400 and 500) which comprises a three bit Short Access Request code point "100" (402 and 502) and indicates at least one capability of the wireless device $104_2$. In one example, the access request message 400 (e.g., 11 bit EGPRS PACKET CHANNEL REQUEST message 400) has the three bit Short Access Request code point '100' 402 and thereafter eight bits 404 of which at least a portion of the eight bits 404 would be used to indicate one or more capabilities of the wireless device $104_2$. In another example, the access request message 500 (e.g., 11 bit EGPRS PACKET CHANNEL REQUEST message 500) has the three bit Short Access Request code point '100' 502 and thereafter eight bits are defined as follows: (1) a one bit priority field 504; (2) a one bit EGPRS support field 506; (3) a three bit spare field 508 (which are used to indicate at least one capability of the wireless device $104_2$); and (4) a three bit randombits field 510 (see above description for more details about these various fields 504, 506, 508 and 510). The indicated one or more capabilities can include (for example): (1) power efficient operation (e.g., no access to external power); (2) access priority (e.g., alarm reporting); and (3) EGPRS support. At step 604, the wireless device $104_2$ receives, from the wireless access node $102_2$, an immediate assignment message 412 and 512 that indicates assigned radio resources for the wireless device $104_2$, wherein the assigned radio resources are based on the at least one capability of the wireless device $104_2$. For example, the immediate assignment message 412 and 512 can indicate that the assigned radio resources are pre-allocated uplink radio blocks and are therefore not dynamically assigned using the USF field of the downlink. The other wireless devices $104_1$, $104_3$ ... $104_n$ can also be configured in a similar manner to perform method 600.

Figure 7:
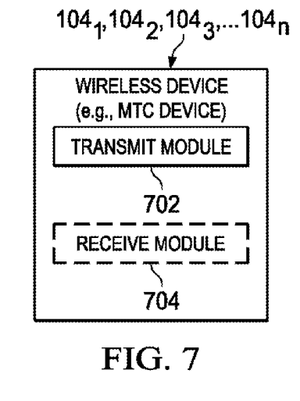
FIG. 7 is a block diagram illustrating structures of an exemplary wireless device configured in accordance with an embodiment of the present disclosure.

Referring to FIG. 7, there is a block diagram illustrating the structures of an exemplary wireless device $104_2$ (for example) configured in accordance with an embodiment of the present disclosure. In one embodiment, the wireless device $104_2$ may comprise a transmit module 702 and a receive module 704. The transmit module 702 is configured to transmit an access request message 400 and 500 (e.g., 11 bit EGPRS PACKET CHANNEL REQUEST message 400 and 500) which comprises a three bit Short Access Request code point "100" (402 and 502) and indicates at least one capability of the wireless device $104_2$. In one example, the access request message 400 (e.g., 11 bit EGPRS PACKET CHANNEL REQUEST message 400) has the three bit Short Access Request code point '100' 402 and thereafter eight bits 404 of which at least a portion of the eight bits 404 would be used to indicate one or more capabilities of the wireless device $104_2$. In another example, the access request message 500 (e.g., 11 bit EGPRS PACKET CHANNEL REQUEST message 500) has the three bit Short Access Request code point '100' 502 and thereafter eight bits which are defined as follows: (1) a one bit priority field 504; (2) a one bit EGPRS support field 506; (3) a three bit spare field 508 (which are used to indicate at least one capability of the wireless device $104_2$); and (4) a three bit randombits field 510 (see above description for more details about fields 504, 506, 508 and 510). The indicated one or more capabilities can include (for example): (1) power efficient operation (e.g., no access to external power); (2) access priority (e.g., alarm reporting); and (3) EGPRS support. The receive module 704 is configured to receive, from the wireless access node $102_2$, an immediate assignment message 412 and 512 that indicates assigned radio resources for the wireless device $104_2$, wherein the assigned radio resources are based on the at least one capability of the wireless device $104_2$. For example, the immediate assignment message 412 and 512 can indicate that the assigned radio resources are pre-allocated uplink radio blocks and are therefore not dynamically assigned using the USF field of the downlink. The wireless device $104_2$ may also include many other components, modules or structures which are well-known, but for clarity, only the components, modules or structures needed to describe the features of the present disclosure are described herein.

As those skilled in the art will appreciate, the above-described modules 702 and 704 of the wireless device $104_2$ (for example) may be implemented separately as suitable dedicated circuits. Further, the modules 702 and 704 can also be implemented using any number of dedicated circuits through functional combination or separation. In some embodiments, the modules 702 and 704 may be even combined in a single application specific integrated circuit (ASIC). As an alternative software-based implementation, the wireless device $104_2$ (for example) may comprise a memory $120_2$, a processor $118_2$ (including but not limited to a microprocessor, a microcontroller or a Digital Signal Processor (DSP), etc.) and a transceiver $110_2$. The memory $120_2$ stores machine-readable program code executable by the processor $118_2$ to cause the wireless device $104_2$ (for example) to perform the steps of the above-described method 600. It should be appreciated that the other wireless devices $104_1$, $104_3$ ... $104_n$ can also be configured in a similar manner as the wireless device $104_2$ to perform method 600.

Figure 8:
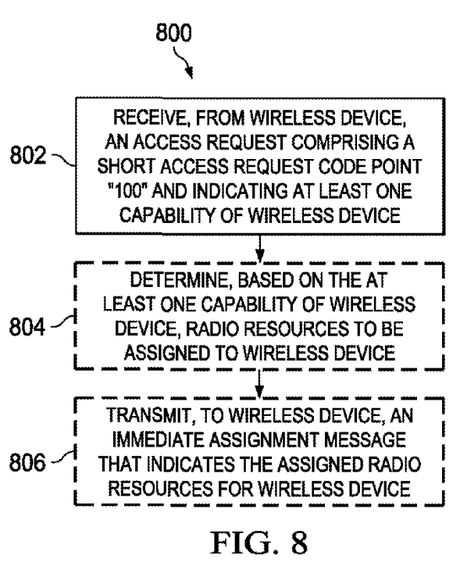
FIG. 8 is a flowchart of a method implemented in a wireless access node in accordance with an embodiment of the present disclosure.

Referring to FIG. 8, there is a flowchart of a method 800 implemented in a wireless access node $102_2$ (for example) in accordance with an embodiment of the present disclosure. At step 802, the wireless access node $102_2$ receives, from the wireless device $104_2$, an access request message 400 and 500 (e.g., 11 bit EGPRS PACKET CHANNEL REQUEST message 400 and 500) which comprises a three bit Short Access Request code point "100" (402 and 502) and indicates at least one capability of the wireless device $104_2$. In one example, the access request message 400 (e.g., 11 bit EGPRS PACKET CHANNEL REQUEST message 400) has the three bit Short Access Request code point '100' 402 and thereafter eight bits 404 of which at least a portion of the eight bits 404 would be used to indicate one or more capabilities of the wireless device $104_2$. In another example, the access request message 500 (e.g., 11 bit EGPRS PACKET CHANNEL REQUEST message 500) has the three bit Short Access Request code point '100' 502 and thereafter eight bits which are defined as follows: (1) a one bit priority field 504; (2) a one bit EGPRS support field 506; (3) a three bit spare field 508 (which are used to indicate at least one capability of the wireless device $104_2$); and (4) a three bit randombits field 510 (see above description for more details about the various fields 504, 506, 508 and 510). The indicated one or more capabilities can include (for example): (1) power efficient operation (e.g., no access to external power); (2) access priority (e.g., alarm reporting); and (3) EGPRS support. At step 804, the wireless access node $102_2$ determines, based on the at least one capability of the wireless device $104_2$, radio resources to be assigned to the wireless device $104_2$. At step 806, the wireless access node $102_2$ transmits, to the wireless device $104_2$, an immediate assignment message 412 and 512 that indicates the assigned radio resources for the wireless device $104_2$. For example, the immediate assignment message 412 and 512 can indicate that the assigned radio resources are pre-allocated uplink radio blocks and are therefore not dynamically assigned using the USF field of the downlink. The other wireless access node $102_1$ can also be configured in a similar manner as the wireless access node $102_2$ to perform method 800.

Figure 9:
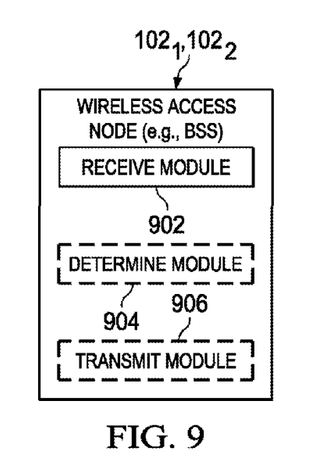
FIG. 9 is a block diagram illustrating a structure of an exemplary wireless access node configured in accordance with an embodiment of the present disclosure.

Referring to FIG. 9, there is a block diagram illustrating a structure of an exemplary wireless access node $102_2$ (for example) configured in accordance with an embodiment of the present disclosure. In one embodiment, the wireless access node $102_2$ may comprise a receive module 902, a determine module 904, and a transmit module 906. The receive module 902 is configured to receive, from the wireless device 104₂, an access request message 400 and 500 (e.g., 11 bit EGPRS PACKET CHANNEL REQUEST message 400 and 500) which comprises a three bit Short Access Request code point "100" (402 and 502) and indicates at least one capability of the wireless device 104₂. In one example, the access request message 400 (e.g., 11 bit EGPRS PACKET CHANNEL REQUEST message 400) has the three bit Short Access Request code point '100' 402 and thereafter eight bits 404 of which at least a portion of the eight bits 404 would be used to indicate one or more capabilities of the wireless device 104₂. In another example, the access request message 500 (e.g., 11 bit EGPRS PACKET CHANNEL REQUEST message 500) has the three bit Short Access Request code point '100' 502 and thereafter eight bits which are defined as follows: (1) a one bit priority field 504; (2) a one bit EGPRS support field 506; (3) a three bit spare field 508 (which are used to indicate at least one capability of the wireless device 104₂); and (4) a three bit randombits field 510 (see above description for more details about the various fields 504, 506, 508 and 510). The indicated one or more capabilities can include (for example): (1) power efficient operation (e.g., no access to external power); (2) access priority (e.g., alarm reporting); and (3) EGPRS support. The determine module 904 is configured to determine, based on the at least one capability of the wireless device 104₂, radio resources to be assigned to the wireless device 104₂. The transmit module 906 is configured to transmit, to the wireless device 104₂, an immediate assignment message 412 and 512 that indicates the assigned radio resources for the wireless device 104₂. For example, the immediate assignment message 412 and 512 can indicate that the assigned radio resources are pre-allocated uplink radio blocks and are therefore not dynamically assigned using the USF field of the downlink. The wireless access node 102₂ may also include many other components, modules or structures which are well-known, but for clarity, only the components, modules or structures needed to describe the features of the present disclosure are described herein.

As those skilled in the art will appreciate, the above-described modules 902, 904 and 906 of the wireless access node 102₂ (for example) may be implemented separately as suitable dedicated circuits. Further, the modules 902, 904 and 906 can also be implemented using any number of dedicated circuits through functional combination or separation. In some embodiments, the modules 902, 904 and 906 may be even combined in a single application specific integrated circuit (ASIC). As an alternative software-based implementation, the wireless access node 102₂ (for example) may comprise a memory 134₂, a processor 132₂ (including but not limited to a microprocessor, a microcontroller or a Digital Signal Processor (DSP), etc.) and a transceiver 122₂. The memory 134₂ stores machine-readable program code executable by the processor 132₂ to cause the wireless access node 102₂ (for example) to perform the step of the above-described method 800. It should be appreciated that the other wireless access node 102₁ can also be configured in a similar manner to the wireless access node 102₂ to perform method 800.

In view of the foregoing, it should be appreciated that the wireless devices 104₁, 104₂, 104₃ . . . 104ₙ, the wireless access node 102₁ and 102₂, and the various methods 600 and 800 for utilizing the optimized access request message 400 and 500 (e.g., the EGPRS packet channel request message 400 and 500) are a marked improvement of the prior art as described herein. In an alternative embodiment, the wireless device 104₂ (for example) can use the Short Access Request code point "100" 402 and 502 itself rather than the subsequent bits 404 and 508 to indicate a wireless device capability. For example, the wireless device 104₂ (for example) can use the Short Access Request code point "100" 402 and 502 itself to indicate that the sending wireless device 104₂ is to be managed in a power efficient manner (e.g., one phase access should be prioritized for contention resolution, and requests for the wireless device to send measurement reports should be minimized if not eliminated altogether).

Moreover, it should be appreciate that the wireless devices 104₁, 104₂, 104₃ . . . 104ₙ and the wireless access node 102₁ and 102₂ would utilize the optimized access request message 400 and 500 (e.g., the EGPRS packet channel request message 400 and 500) during a system access procedure. For example, the system access procedure could be as follows:

Assume a power limited wireless device 104₂ (for example) is camping on a cell that sends system information on the BCCH that indicates power efficient management of wireless devices is supported (i.e., this system information indicates the wireless access node 102₂ (for example) supports reception of optimized access request message 500 (for example)).

The wireless device 104₂ thereby determines that it can send an optimized access request message 500 to indicate to the wireless access node 102₂ that the wireless device 104₂ supports power efficient operation and therefore prefers to be managed accordingly.

Upon receiving the optimized access request message 500, the wireless access node 102₂ performs contention resolution using the one phase access method to minimize battery consumption (due to system access attempts) in the wireless device 104₂.

In addition, the reception of the optimized access request message 500 indicates to the wireless access node 102₂ that when radio resources have been assigned to the wireless device 104₂ then it should be queried for neighbor cell measurements sparingly due to its battery limitation.

Additional capability information included in the optimized access request message 500 may indicate the extent to which radio coverage conditions being experienced by the wireless device 104₂ are degraded when compared to normal radio conditions.

The wireless access node 102₂ responds to the indication of the degraded radio condition by assigning the wireless device 104₂ radio resources that includes pre-allocated uplink radio blocks (i.e., uplink radio blocks that are not dynamically assigned using the USF field of the downlink as used in the legacy procedures).

After reception of the pre-allocated uplink radio blocks, the wireless access node 102₂ knows that the wireless device will, in the interest of battery conservation, listen for the expected downlink control message confirmation reception of all uplink data blocks for a limited pre-determined time window and will therefore ensure that the corresponding downlink control message is sent accordingly.

After transmission of the downlink control message (and reception thereof by the wireless device 104₂) both the wireless access node 102₂ and the wireless device 104₂ will, in the interest of the wireless device's battery conservation, implicitly release all assigned radio resources (i.e., no additional signaling is needed to release the assigned radio resources).

Those skilled in the art will appreciate that the use of the term "exemplary" is used herein to mean "illustrative," or "serving as an example," and is not intended to imply that a particular embodiment is preferred over another or that a particular feature is essential. Likewise, the terms "first" and "second," and similar terms, are used simply to distinguish one particular instance of an item or feature from another, and do not indicate a particular order or arrangement, unless the context clearly indicates otherwise. Further, the term "step," as used herein, is meant to be synonymous with "operation" or "action." Any description herein of a sequence of steps does not imply that these operations must be carried out in a particular order, or even that these operations are carried out in any order at all, unless the context or the details of the described operation clearly indicates otherwise.

Of course, the present disclosure may be carried out in other specific ways than those herein set forth without departing from the scope and essential characteristics of the invention. One or more of the specific processes discussed above may be carried out in a cellular phone or other communications transceiver comprising one or more appropriately configured processing circuits, which may in some embodiments be embodied in one or more application-specific integrated circuits (ASICs). In some embodiments, these processing circuits may comprise one or more microprocessors, microcontrollers, and/or digital signal processors programmed with appropriate software and/or firmware to carry out one or more of the operations described above, or variants thereof. In some embodiments, these processing circuits may comprise customized hardware to carry out one or more of the functions described above. The present embodiments are, therefore, to be considered in all respects as illustrative and not restrictive.

Although multiple embodiments of the present disclosure have been illustrated in the accompanying Drawings and described in the foregoing Detailed Description, it should be understood that the invention is not limited to the disclosed embodiments, but instead is also capable of numerous rearrangements, modifications and substitutions without departing from the present disclosure that as has been set forth and defined within the following claims.

The invention claimed is:

1. A wireless access node configured to interact with a wireless device, the wireless access node comprising:
   a processor; and,
   a memory that stores processor-executable instructions, wherein the processor interfaces with the memory to execute the processor-executable instructions, whereby the wireless access node is configured to:
      receive, from the wireless device, an 11-bit Enhanced General Packet Radio Service (EGPRS) packet channel request message which comprises a three bit Short Access Request code point "100" and eight bits thereafter where at least a portion of the eight bits is used to indicate at least one capability of the wireless device, and where the eight bits are part of the received 11-bit EGPRS packet channel request message;
      determine, based on the at least one capability of the wireless device, radio resources to be assigned to the wireless device;
      transmit, to the wireless device, an immediate assignment message that indicates the assigned radio resources for the wireless device, wherein the immediate assignment message is modified such that a legacy wireless device that still uses the three bit Short Access Request code point "100" in a legacy access request message will not receive a matching immediate assignment message; and,
   wherein the at least one capability of the wireless device comprises an indication that the wireless device is power limited, and wherein the wireless access node based on the indication that the wireless device is power limited is further configured to:
      ensure a system access procedure with the wireless device is completed using a 1 phase access; and
      avoid requesting measurement information from the wireless device while the wireless device is in a packet transfer mode.

2. The wireless access node of claim 1, wherein the eight bits comprise the following:
   a one bit priority field;
   a one bit EGPRS support field;
   a three bit spare field which indicates the at least one capability of the wireless device; and
   a three bit randombits field.

3. The wireless access node of claim 1, wherein the at least one capability of the wireless device comprises at least one of:
   an indication of support for a power efficient operation;
   an indication of access priority; or
   an indication of Enhanced General Packet Radio Service (EGPRS) support.

4. A method in a wireless access node which is configured to interact with a wireless device, the method comprising:
   receiving, from the wireless device, an 11-bit Enhanced General Packet Radio Service (EGPRS) packet channel request message which comprises a three bit Short Access Request code point "100" and eight bits thereafter where at least a portion of the eight bits is used to indicate at least one capability of the wireless device, and where the eight bits are part of the received 11-bit EGPRS packet channel request message;
   determining, based on the at least one capability of the wireless device, radio resources to be assigned to the wireless device;
   transmitting, to the wireless device, an immediate assignment message that indicates the assigned radio resources for the wireless device, wherein the immediate assignment message is modified such that a legacy wireless device that still uses the three bit Short Access Request code point "100" in a legacy access request message will not receive a matching immediate assignment message; and
   wherein the at least one capability of the wireless device comprises an indication that the wireless device is power limited, and wherein the wireless access node based on the indication that the wireless device is power limited performs the following:
      ensuring a system access procedure with the wireless device is completed using a 1 phase access; and
      avoiding requesting measurement information from the wireless device while the wireless device is in a packet transfer mode.

5. The method of claim 4, wherein the eight bits comprise the following:
   a one bit priority field;
   a one bit EGPRS support field;
   a three bit spare field which indicates the at least one capability of the wireless device; and
   a three bit randombits field.

6. The method of claim 4, wherein the at least one capability of the wireless device comprises at least one of:

an indication of support for a power efficient operation;
an indication of access priority; or
an indication of Enhanced General Packet Radio Service (EGPRS) support.

7. The wireless access node of claim 1, wherein the eight bits comprise an eight bit spare field where at least a portion of the eight bit spare field is used to indicate the at least one capability of the wireless device.

8. The method of claim 4, wherein the eight bits comprise an eight bit spare field where at least a portion of the eight bit spare field is used to indicate the at least one capability of the wireless device.

\* \* \* \* \*